United States Patent
Ferrara et al.

(10) Patent No.: US 9,996,324 B1
(45) Date of Patent: Jun. 12, 2018

(54) COOPERATIVE CREATION OF DATAFLOW MODELS USING SPARSE RANDOM INSTRUMENTATION

(71) Applicant: International Business Machines Corporation, Armonk, NY (US)

(72) Inventors: Pietro Ferrara, White Plains, NY (US); Marco Pistoia, Amawalk, NY (US); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/407,830

(22) Filed: Jan. 17, 2017

(51) Int. Cl.
G06F 9/45 (2006.01)

(52) U.S. Cl.
CPC .................... G06F 8/433 (2013.01)

(58) Field of Classification Search
None
See application file for complete search history.

(56) References Cited

U.S. PATENT DOCUMENTS

| | | | | |
|---|---|---|---|---|
| 8,688,729 B2* | 4/2014 | Gagliardi | ............ | G06F 11/3612 707/769 |
| 2003/0045946 A1* | 3/2003 | Hattori | ............... | G05B 23/0264 700/27 |
| 2007/0261032 A1* | 11/2007 | Chen | ................... | G06F 11/3466 717/130 |
| 2008/0244533 A1* | 10/2008 | Berg | .................. | G06F 11/3447 717/128 |
| 2016/0359947 A1* | 12/2016 | Rao | ........................ | H04L 67/025 |
| 2017/0161060 A1* | 6/2017 | Abadi | ....................... | G06F 8/72 |

OTHER PUBLICATIONS

Guoliang Jin et al., "Instrumentation and Sampling Strategies for Cooperative Concurrency Bug Isolation", OOPSLA/SPLASH'10, Oct. 17-21, 2010, Reno/Tahoe, Nevada, USA.*

* cited by examiner

*Primary Examiner* — Philip Wang
(74) *Attorney, Agent, or Firm* — Scully, Scott, Murph & Presser, P.C.; Daniel P. Morris, Esq.

(57) ABSTRACT

Dataflow analysis is provided by monitoring a first and a second computing device to detect an initiation of an application on one or more of these computing devices. In response to detecting the initiation of the application on the first computing device, a first instrumentation procedure is applied to a first randomly selected portion of the application to produce a recorded dataflow for the first randomly selected portion. In response to detecting the initiation of the application on the second computing device, a second instrumentation procedure is applied to a second randomly selected portion of the application to produce a recorded dataflow for the second randomly selected portion. An integrated dataflow solution is assembled for the application from the recorded dataflow for the first randomly selected portion and the recorded dataflow for the second randomly selected portion.

20 Claims, 3 Drawing Sheets

US 9,996,324 B1

COOPERATIVE CREATION OF DATAFLOW MODELS USING SPARSE RANDOM INSTRUMENTATION

FIELD

The present application relates generally to dataflow analysis and, more particularly, to techniques for creating dataflow models using sparse random instrumentation.

BACKGROUND

Dataflow analysis provides valuable information about the behavior and characteristics of an application under test. Some dataflow analysis techniques track information flow through the application, starting with statements reading user inputs and proceeding to statements that perform security-sensitive operations. These techniques form a basis for static/dynamic security analysis. Other dataflow analysis techniques decide whether or not a given statement or code block can be moved to another location in the code. The statement or code block may be moved for purposes of optimization or refactoring. Code refactoring is the process of restructuring existing computer code, without changing the external behavior of the code. Advantages of refactoring include improved code readability and reduced complexity; these characteristics can improve source code maintainability. Yet another set of dataflow analysis techniques perform reasoning about bottlenecks, low-utility data structures, and other pathologies in the execution of the program. This reasoning approach forms the basis for advanced profiling techniques.

Instrumentation refers to a process of monitoring or measuring the performance of the application under test, for the purpose of diagnosing errors and writing trace information. Programmers implement instrumentation in the form of code instructions that monitor specific components in a system. For example, these instructions may output logging information for display on a screen. One difficulty in gathering dataflow information is that a thick layer of instrumentation is required atop the application under test, including all statements in the application along with memory manipulations. This is because data flows through any operation that manipulates memory, and therefore there is a need to track substantial amounts of information across the complete application. As this tracking requirement suggests, dataflow analysis is highly unscalable, and can be implemented feasibly only if the application under test is relatively small. Thus, there exists a need to overcome at least one of the preceding deficiencies and limitations of the related art.

SUMMARY

The following summary is merely intended to be exemplary. The summary is not intended to limit the scope of the claims.

A method for performing dataflow analysis, in one aspect, may comprise monitoring a plurality of computing devices to detect an initiation of an application on one or more of the plurality of computing devices. The plurality of computing devices comprises at least a first computing device and a second computing device. In response to detecting the initiation of the application on the first computing device, a first instrumentation procedure is applied to a first randomly selected portion of the application to produce a recorded dataflow for the first randomly selected portion. In response to detecting the initiation of the application on the second computing device, a second instrumentation procedure is applied to a second randomly selected portion of the application to produce a recorded dataflow for the second randomly selected portion. An integrated dataflow solution is assembled for the application from the recorded dataflow for the first randomly selected portion and the recorded dataflow for the second randomly selected portion.

A computer program product for performing dataflow analysis, in another aspect, may comprise a computer-readable storage medium having a computer-readable program stored therein, wherein the computer-readable program, when executed on a processor, causes the processor to monitor a plurality of computing devices to detect an initiation of an application on one or more of the plurality of computing devices. The plurality of computing devices comprises at least a first computing device and a second computing device. In response to detecting the initiation of the application on the first computing device, a first instrumentation procedure is applied to a first randomly selected portion of the application to produce a recorded dataflow for the first randomly selected portion. In response to detecting the initiation of the application on the second computing device, a second instrumentation procedure is applied to a second randomly selected portion of the application to produce a recorded dataflow for the second randomly selected portion. An integrated dataflow solution is assembled for the application from the recorded dataflow for the first randomly selected portion and the recorded dataflow for the second randomly selected portion.

An apparatus for performing dataflow analysis, in another aspect, may comprise a processor and a memory coupled to the processor, wherein the memory comprises instructions which, when executed by the processor, cause the processor to monitor a plurality of computing devices to detect an initiation of an application on one or more of the plurality of computing devices. The plurality of computing devices comprises at least a first computing device and a second computing device. In response to detecting the initiation of the application on the first computing device, a first instrumentation procedure is applied to a first randomly selected portion of the application to produce a recorded dataflow for the first randomly selected portion. In response to detecting the initiation of the application on the second computing device, a second instrumentation procedure is applied to a second randomly selected portion of the application to produce a recorded dataflow for the second randomly selected portion. An integrated dataflow solution is assembled for the application from the recorded dataflow for the first randomly selected portion and the recorded dataflow for the second randomly selected portion.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

Recent technological advances—and in particular the emergence of the mobile and cloud forms of computing, and later the mobile cloud—are presenting a unique opportunity for cooperative, collaborative computation methods. According to a set of illustrative embodiments described herein, a plurality of analysis agents contribute towards a goal of computing a single dataflow solution for an application under test. For example, in a mobile environment, multiple users may be executing the same code substantially simultaneously, thereby concurrently exploring different execution paths within the code and revealing different code behaviors.

Figure 1:
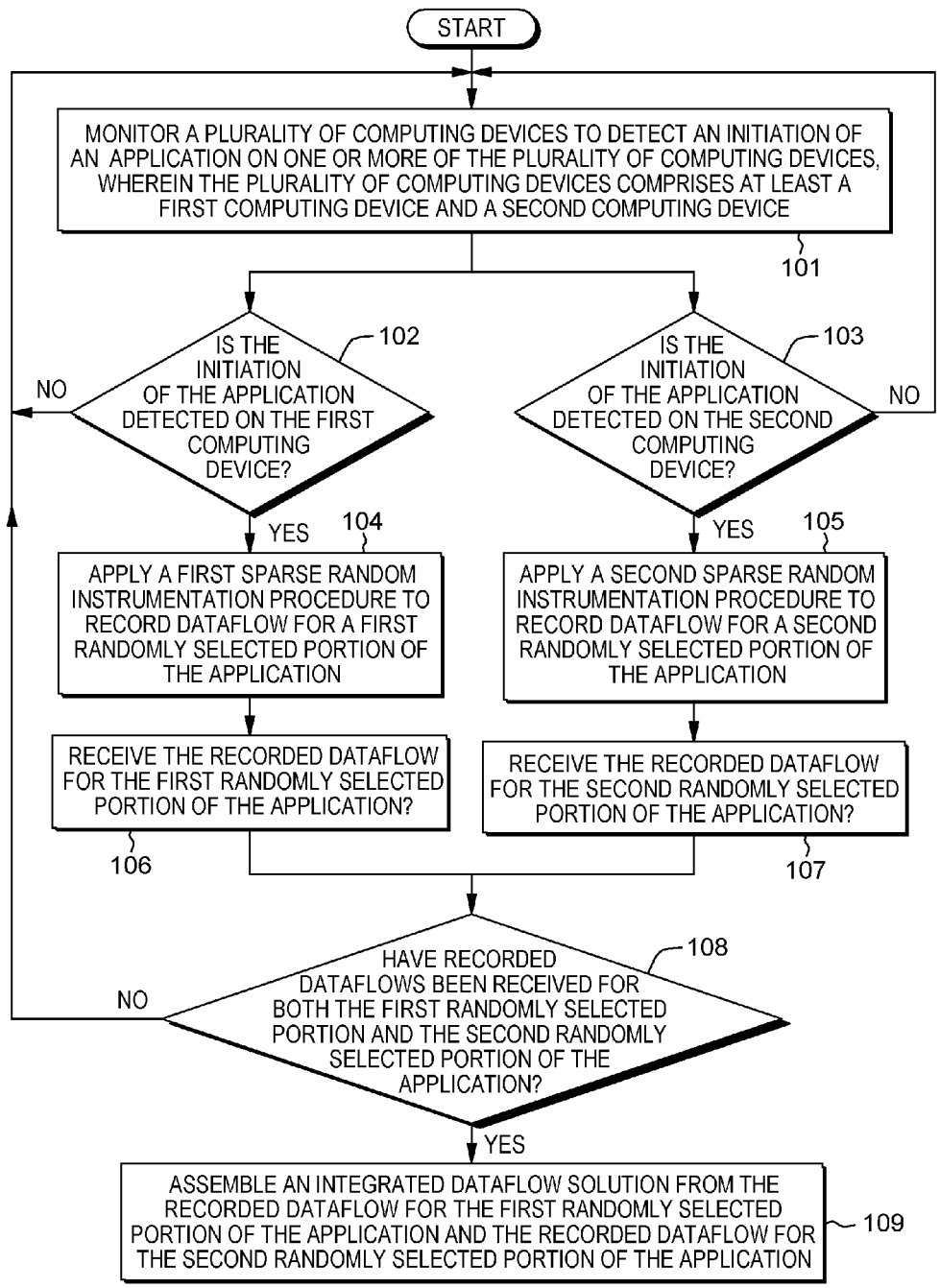
FIG. 1 is a flowchart illustrating an exemplary method for performing dataflow analysis in accordance with one set of embodiments of the present disclosure.
Figure 2:
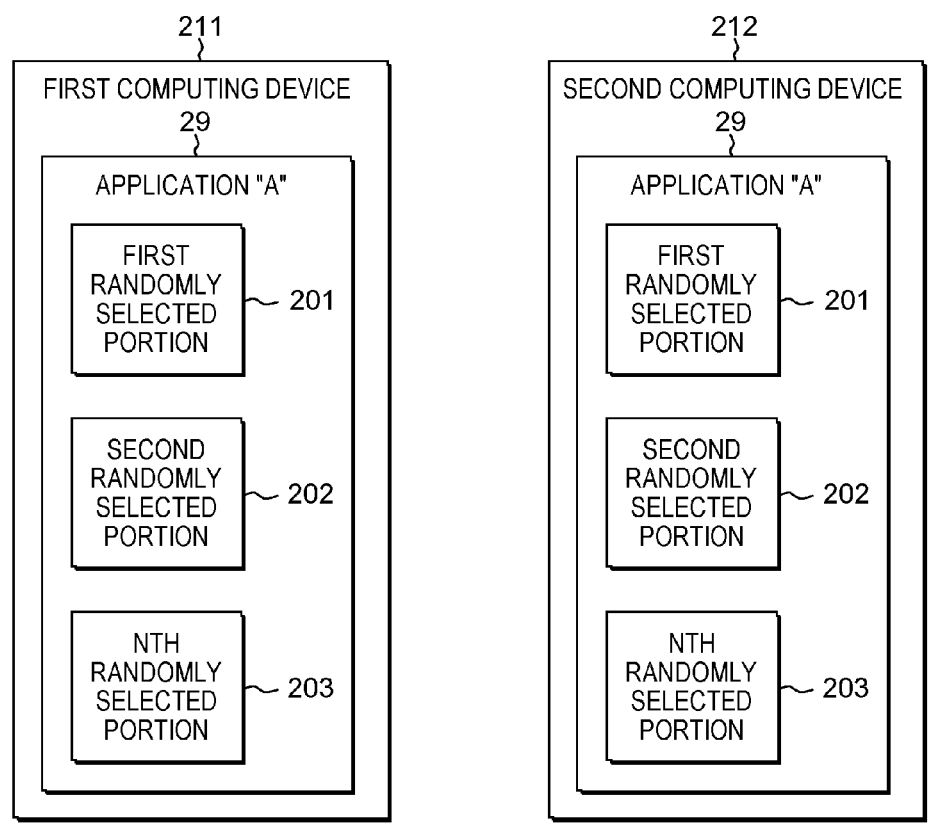
FIG. 2 is a hardware block diagram of an exemplary operational environment in which the procedure of FIG. 1 may be performed.

FIG. 1 is a flowchart illustrating an exemplary method for performing dataflow analysis in accordance with one set of embodiments of the present disclosure, and FIG. 2 is a hardware block diagram of an exemplary operational environment in which the procedure of FIG. 1 may be performed. The procedure of FIG. 1 commences at block 101 where a plurality of computing devices are monitored to detect an initiation of an application on one or more of the plurality of computing devices. The plurality of computing devices comprises at least a first computing device 211 (FIG. 2) and a second computing device 212. Each of the first and second computing devices 211 and 212 is configured for executing an application, such as Application "A" 29, which is an application that is to be analyzed. Application "A" 29 includes a first randomly selected portion 201, a second randomly selected portion 202, and an Nth randomly selected portion 203. The first, second, and Nth randomly selected portions 201, 202, and 203 may represent, for example, sections or blocks of code, or groups of code statements.

The operational sequence of FIG. 1 proceeds from block 101 to block 102, or from block 101 to block 103, or from block 101 to blocks 102 and 103. The operations of blocks 102, 104, and 106 may be performed before, after, contemporaneously, or simultaneously with the operations of blocks 103, 105, and 107. At block 102, in response to detecting the initiation of Application "A" 29 (FIG. 2) on the first computing device 211, the affirmative branch of block 102 (FIG. 1) leads to block 104 where a first sparse random instrumentation procedure is applied to produce recorded dataflow for the first randomly selected portion 201 (FIG. 2) of Application "A" 29. The negative branch of block 102 (FIG. 1) loops back to block 101.

At block 103 (FIG. 1), in response to detecting the initiation of Application "A" 29 (FIG. 2) on the second computing device 212, the affirmative branch of block 103 (FIG. 1) leads to block 105 where a second sparse random instrumentation procedure is applied to produce recorded dataflow for the second randomly selected portion 202 (FIG. 2) of Application "A" 29. The negative branch of block 103 loops back to block 101.

The first sparse random instrumentation procedure of block 104 (FIG. 1) may, but need not, be identical to the second sparse random instrumentation procedure of block 105. The first and second sparse random instrumentation procedures of blocks 104 and 105 (FIG. 1) are "sparse" in the sense that an execution of Application "A" 29 (FIG. 2) does not suffer from any humanly perceptible performance slowdown or other humanly discernible change in the behavior of Application "A" 29. Applications generally include a plurality of statements. Sparseness is provided by using only a small fraction of the plurality of statements to produce the recorded dataflow for the first randomly selected portion, and to produce the recorded dataflow for the second randomly selected portion. For example, each of the randomly selected portions may comprise less than 20% of a total number of code statements in Application "A" 29. In a further embodiment disclosed herein, each of the randomly selected portions comprise no more than 10% of a total number of code statements in Application "A" 29.

Random selection of portions of Application "A" 29 serves to ensure that coverage of code pathways due to multiple instances of Application "A" 29 running simultaneously, concurrently, or successively on different machines, such as the first and second computing devices 211 and 212, is asymptotically complete. Otherwise, if there is any non-random bias with regard to the instrumentation and selection of portions of Application "A" 29, then high-percentage coverage of all portions of code within Application "A" 29 is not guaranteed.

The operational sequence of FIG. 1 progresses from block 104 to block 106 where the recorded dataflow for the first randomly selected portion 201 (FIG. 2) of Application "A" 29 is received. Likewise, the operational sequence of FIG. 1 progresses from block 105 to block 107 where the recorded dataflow for the second randomly selected portion 202 (FIG. 2) of Application "A" 29 is received. From block 106 (FIG. 1) or block 107, the program advances to block 108 where a test is performed to ascertain whether or not recorded dataflows have been received for both the first randomly selected portion 201 (FIG. 2) and the second randomly selected portion 202 of Application "A" 29 (FIG. 2). The receiving may be performed, for example, by a server of a computing system or a server of a mobile communications network, to be discussed in greater detail hereinafter with reference to FIG. 3. Returning to FIGS. 1 and 2, when recorded dataflows have been received for at least two randomly selected portions of Application "A" 29 (FIG. 2), such as the first and second randomly selected portions 201 and 202, then the program proceeds to block 109 (FIG. 1) where the recorded dataflow for the first randomly selected portion 201 (FIG. 2) of the Application "A" 29 and the recorded dataflow for the second randomly selected portion 202 of the Application "A" 29 are used to assemble an integrated dataflow solution for the application. The negative branch from block 108 loops back to block 101.

Illustratively, the integrated dataflow solution is assembled by periodically, repeatedly, or continuously transmitting at least one of the recorded dataflow for the first randomly selected portion or the recorded dataflow for the second randomly selected portion to a server-side component. The server-side component is thus aware of multiple partial dataflow solutions due to the server-side component interacting with multiple application instances. The server-side component uses these partial dataflow solutions to formulate the integrated dataflow solution for the application. For purposes of illustration, the server-side component may be implemented using one or more computer servers that are accessed over a network such as a wireless network.

It should be understood that the description of FIG. 1 refers to the first and second randomly selected portions 201 and 202 of Application "A" 29 (FIG. 2) for purposes of illustration, as any number of randomly selected portions of an application may be used. In practice, a number of different randomly selected portions may be used, wherein this number is greater than two. For example, each of the randomly selected portions may comprise less than 20% of a total number of code statements in Application "A" 29. In a further embodiment disclosed herein, each of the randomly selected portions comprise no more than 10% of a total number of code statements in Application "A" 29.

Due to the fact that portions of Application "A" 29 are randomly selected, it is theoretically possible that some dataflow paths of this application could be missed. However, in this scenario, the missing dataflow information may be inferred using conservative static dataflow information. For example, if none of the randomly selected portions of Application "A" 29 included an exemplary method called convolution( ), then a static dataflow model for the method convolution( ) is constructed and integrated into the integrated dataflow solution of block 109 (FIG. 1). Even in situations where the missing dataflow is not inferred, there are many important clients of dataflow analysis that can make sound use of partial dataflow information. As an example, dynamic dataflow properties are useful for performing compile-time optimization, analysis specialization, staged analysis, enhanced runtime environments, and just-in-time optimizations, so obtaining a partial result that does not include all possible data paths for Application "A" 29 (FIG. 2) is still highly useful.

In situations where complete coverage of all dataflow paths of Application "A" 29 is desired or required, a learning concept such as epsilon-net may be employed. An epsilon-net ($\epsilon$-net) performs an approximation of a general set by using a collection of simpler subsets. Let X be a set and R be a set of subsets of X. A pair of X and R is called a range space or hypergraph, and the elements of R are called ranges or hyperedges. An $\epsilon$-net of a subset P of X is a subset N of P such that any range r$\in$R with $|r \cap P| \geq \epsilon |P|$ intersects N. In other words, any range that intersects at least a proportion $\epsilon$ of the elements of P must also intersect the $\epsilon$-net N. For example, suppose X is a set of points in a two-dimensional plane, R is a set of closed filled rectangles (products of closed intervals), and P is a unit square $[0, 1] \times [0, 1]$. Then a set N may be constructed consisting of 8 points, and the set N is a ¼-net of P, because any closed filled rectangle intersecting at least ¼ of the unit square must intersect one of these points. In fact, any (axis-parallel) square, regardless of size, will have a similar 8-point ¼-net.

The epsilon-net procedure facilitates the development of efficient approximation algorithms. For example, suppose one wishes estimate an upper bound on an area of a given region P that falls inside a particular rectangle. One can estimate this to within an additive factor of $\epsilon$ times the area of P by first finding an $\epsilon$-net of P, counting the proportion of elements in the $\epsilon$-net falling inside the rectangle, and then multiplying by the area of P. The runtime of the algorithm depends only on $\epsilon$ and not P. One straightforward way to compute an $\epsilon$-net with high probability is to take a sufficient number of random points, where the number of random points also depends only on $\epsilon$. For example, any rectangle in a unit square containing at most three points in the ¼-net has an area of at most $\frac{3}{8} + \frac{1}{4} = \frac{5}{8}$.

The epsilon net concept may be applied to the procedure of FIG. 1 to formulate a coverage criterion for the application. An iteration is performed over all running instances of Application "A" 29 (FIG. 2). Instrumentation code is added to Application "A" 29 until epsilon coverage for a designated or predetermined value of epsilon is reached. The instrumentation code may be added at random, or added using an empirical probability distribution, to ensure coverage of all dataflow paths for Application "A" 29.

According to a set of further embodiments disclosed herein, Application "A" 29 may be a mobile application, and the first and second computing devices 211, 212 may each comprise mobile devices. The procedure of FIG. 1 is well suited to analysis of mobile applications in general, including enterprise mobile applications. This is because mobile applications often have a server-side component that a mobile device communicates with, such that the server-side component may be programmed to perform the procedure of FIG. 1. Moreover, mobile applications are often executed simultaneously, concurrently, contemporaneously, or successively by a multiplicity of users. Any application that is used by a large number of individuals requires deep dataflow analysis in order to ensure that the application is verified as safe and secure.

Figure 3:
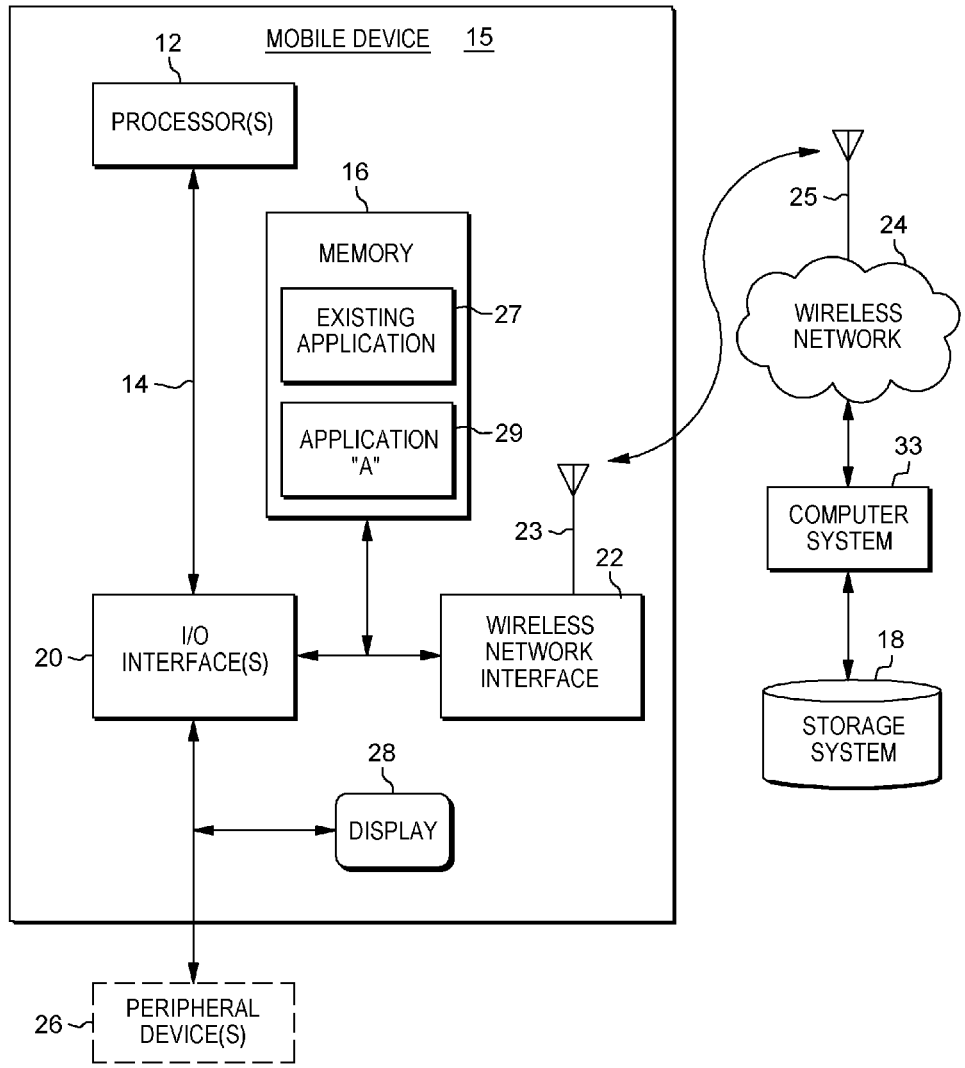
FIG. 3 is a hardware block diagram of an exemplary apparatus for performing dataflow analysis in accordance with procedure of FIG. 1.

FIG. 3 is a schematic of an exemplary system that includes a mobile device 15 operatively coupled to a computer system 33 over a wireless network 24. The system of FIG. 3 is configured for implementing the method of FIG. 1, in one set of embodiments of the present disclosure. The mobile device 15 is a portable computing device. Some illustrative examples of the mobile device 15 include a smartphone, a tablet computer, a cellphone, a personal digital assistant (PDA), a portable communications device, or a navigation system. The mobile device 15 is only one example of a suitable processing system and is not intended to suggest any limitation as to the scope of use or functionality of embodiments of the methodology described herein.

The mobile device 15 includes one or more processors 12 operatively coupled to a computer-readable memory 16. The memory 16 can include computer system readable media in the form of volatile memory, or non-volatile memory, or any of various combinations thereof. Some illustrative examples of volatile memory include random access memory (RAM) and/or cache memory, or other types of memory devices, or any of various combinations thereof. Some illustrative examples of non-volatile memory include read-only memory (ROM), magnetic media such as a "hard drive", a solid-state storage drive, or an optical disk drive. The memory 16 includes an operating system (OS) that is executed by the one or more processors 12. Illustrative examples of operating systems include Andriod™ and Apple iOS™. The one or more processors 12 are configured to execute various types of software applications, sometimes referred to as apps.

The one or more processors 12 may be described in the general context of computer system executable instructions, such as program modules, being executed by a computer system. Generally, program modules may include routines, programs, objects, components, logic, data structures, and so on that perform particular tasks or implement particular abstract data types. Thus, the one or more processors 12 may include a module that performs the methods described herein with reference to FIG. 1. The module may be programmed into the integrated circuits of the one or more processors 12, or loaded from the memory 16, or the wireless network 24, or any of various combinations thereof.

The mobile device 15 may be operational with numerous other general purpose or special purpose computing system environments or configurations. Thus, the mobile device 15 includes a wireless network interface 22 coupled to a first antenna 23. The wireless network interface 22 and the first antenna 23 are configured for communicating with a wireless network 24 that is coupled to a second antenna 25. The wireless network 24 is operatively coupled to a computer system 33. Accordingly, a notification may be sent from the mobile device 15 to the computer system 33 over the wireless network 24 in response to a user of the mobile device 15 initiating a new application on the mobile device. In response to the notification, the computer system 33 performs the procedure of FIG. 1.

Illustratively, the wireless network interface 22 is configured for implementing wireless communication using a wireless standard such as Global System for Mobile Communications (GSM), Universal Mobile Telecommunications System (UMTS), Code Division Multiple Access (CDMA), Long-Term Evolution (LTE), 2G, 3G, 4G, 5G, Near Field Communications (NFC), WiFi, WiMAX, or Bluetooth. In general, these wireless standards are configured for efficiently dividing the finite RF spectrum among multiple users. For example, GSM uses time-division multiple access (TDMA) and frequency-division multiple access (FDMA) to provide separation among users and cells. UMTS and CDMA-2000 use code-division multiple access (CDMA). WiMAX and LTE use orthogonal frequency division multiplexing (OFDM). Illustratively, the mobile device 15 uses one or more of the foregoing wireless standards to access the Internet through the wireless network 24.

TDMA provides mobile device 15 access to the wireless network 24 by chopping up a physical RF communications channel occupying a given frequency bandwidth into sequential time slices. Each user of the channel takes turns to transmit and receive signals. In reality, only one mobile device 15 is actually using the channel at any specific moment in time. This is analogous to time-sharing on a large computer server. FDMA provides multiuser access by separating the frequencies used by each of a plurality of mobile devices such as the mobile device 15. In GSM, the FDMA approach is used to separate each of a plurality of cells of the wireless network 24, and then TDMA is used to separate each of a plurality of mobile device 15 users within the cell.

CDMA uses spread-spectrum digital modulation to spread voice data over a very wide channel in pseudorandom fashion using a mobile device 15-specific or cell-specific pseudorandom code. A receiver at the wireless network 24 undoes the randomization to collect the bits together and produce the original voice data. As the codes are pseudorandom and selected in such a way as to cause minimal interference to one another, multiple users can talk at the same time and multiple cells can share the same frequency. This causes an added signal noise forcing all users to use more power, which in exchange decreases cell range and battery life.

Orthogonal Frequency Division Multiple Access (OFDMA) uses bundling of multiple small frequency bands that are orthogonal to one another to provide for separation of mobile device 15 users. The users are multiplexed in the frequency domain by allocating specific sub-bands to individual users. This is often enhanced by also performing TDMA and changing the allocation periodically so that different users are assigned different sub-bands at different times. The foregoing wireless standards are provided solely for purposes of illustration, as the mobile device 15 may be configured for communicating with the wireless network 24 using any communications standard.

The mobile device 15 includes an input/output (I/O) interface 20. The I/O interface is used to interface the one or more processors 12 to the wireless network interface 22, a display 28, and one or more optional peripheral devices 26 such as a keyboard, a pointing device, or one or more devices that enable a user to interact with the mobile device 15. The display 28 may be provided in the form of a touch-sensitive screen and/or a miniature keyboard. The touch-sensitive screen may be configured to accept a tactile input or a stylus input, or both. The optional peripheral devices 26 may also include any device, such as a network card or a modem, that enables the mobile device 15 to communicate with one or more other computing devices. Such communication can occur via the I/O interface 20.

The computer system 33 may include a variety of computer system readable media. Such media may be any available media that is accessible by computer system, and it may include both volatile and non-volatile media, removable and non-removable media. In the example of FIG. 2, the computer system 33 is configured for accessing a storage system 18 on which at least one new application 29 is stored. The computer system 33 may be described in the general context of computer system executable instructions, such as program modules, being executed by a computer system. The computer system 33 may include a server. Generally, program modules may include routines, programs, objects, components, logic, data structures, and so on that perform particular tasks or implement particular abstract data types. Examples of well-known computing systems, environments, and/or configurations that may be suitable for implementing the computer system 33 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 33 may be practiced in distributed cloud computing environments where tasks are performed by remote processing devices that are linked through a communications network such as the wireless network 24. In a distributed cloud computing environment, program modules may be located in both local and remote computer system storage media including memory storage devices such as the storage system 18.

The computer system 33 may further include other removable/non-removable, volatile/non-volatile computer system storage media. By way of example only, the storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

Both the mobile device 15 and the computer system 33 can communicate with one or more networks, such as the wireless network 24, a local area network (LAN), a general wide area network (WAN), and/or a public network (e.g., the Internet). It should be understood that although not shown, other hardware and/or software components could be used in conjunction with the computer system 33. Examples include, but are not limited to: microcode, device drivers, redundant processing units, external disk drive arrays, RAID systems, tape drives, and data archival storage systems, etc.

The mobile device 15 may be equipped with a source of battery power. Optionally, the mobile device 15 may also be equipped with a Global Positioning System (GPS) receiver for utilizing one or more location-based services. Other optional features of the mobile device 15 may include a camera, a media player for playing back video or music files, or one or more sensors. Such sensors may include an accelerometer, a compass, a magnetometer, or a gyroscope, allowing detection of orientation of motion. Optionally, the mobile device 15 may provide biometric user authentication, such as using a built-in camera for facial recognition or using a fingerprint sensor for fingerprint recognition.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for performing dataflow analysis, the method comprising:
   monitoring a plurality of computing devices to detect an initiation of an application on one or more of the plurality of computing devices, wherein the plurality of computing devices comprises at least a first computing device and a second computing device;
   in response to detecting the initiation of the application on the first computing device, applying a first instrumentation procedure to a first randomly selected portion of the application to produce a recorded dataflow for the first randomly selected portion;
   in response to detecting the initiation of the application on the second computing device, applying a second instrumentation procedure to a second randomly selected portion of the application to produce a recorded dataflow for the second randomly selected portion; and
   assembling an integrated dataflow solution for the application from the recorded dataflow for the first randomly selected portion and the recorded dataflow for the second randomly selected portion.

2. The method of claim 1 wherein the application comprises a plurality of statements, and the first and second instrumentation procedures are performed sparsely, such that only a small fraction of the plurality of statements are used to produce the recorded dataflow for the first randomly selected portion and the recorded dataflow for the second randomly selected portion, wherein the small fraction comprises less than 20% of a total number of code statements in the application.

3. The method of claim 1 further comprising providing the integrated dataflow solution by periodically, repeatedly or continuously transmitting at least one of the recorded dataflow for the first randomly selected portion or the recorded dataflow for the second randomly selected portion to a computer server.

4. The method of claim 1 wherein the application includes at least one data path that is not used to record dataflow for the first randomly selected portion, and that is also not used to record dataflow for the second randomly selected portion, and the method further comprises applying a static dataflow model to the at least one data path.

5. The method of claim 1 further comprising applying the first and second instrumentation procedures to the application using an epsilon net coverage criterion for the application.

6. The method of claim 5 further comprising adding instrumentation code to the application until epsilon coverage for a designated or predetermined value of epsilon is reached.

7. The method of claim 6 further comprising adding the instrumentation code at random.

8. The method of claim 6 further comprising adding the instrumentation code using an empirical probability distribution, to provide coverage of substantially all dataflow paths for the application.

9. A computer program product for performing dataflow analysis comprising a computer-readable storage medium having a computer-readable analysis agent program stored therein, wherein the computer-readable analysis agent program, when executed on a computer, causes the computer to:
   monitor a plurality of computing devices to detect an initiation of an application on one or more of the plurality of computing devices, wherein the plurality of computing devices comprises at least a first computing device and a second computing device;
   in response to detecting the initiation of the application on the first computing device, apply a first instrumentation procedure to a first randomly selected portion of the application to produce a recorded dataflow for the first randomly selected portion;
   in response to detecting the initiation of the application on the second computing device, apply a second instrumentation procedure to a second randomly selected portion of the application to produce a recorded dataflow for the second randomly selected portion; and
   assemble an integrated dataflow solution for the application from the recorded dataflow for the first randomly selected portion and the recorded dataflow for the second randomly selected portion.

10. The computer program product of claim 9 wherein the application comprises a plurality of statements, and the computer program product is further configured for performing the first and second instrumentation procedures sparsely, such that only a small fraction of the plurality of statements are used to produce the recorded dataflow for the first randomly selected portion and the recorded dataflow for the second randomly selected portion, wherein the small fraction comprises less than 20% of a total number of code statements in the application.

11. The computer program product of claim 9 further configured for providing the integrated dataflow solution by periodically, repeatedly or continuously transmitting at least one of the recorded dataflow for the first randomly selected portion or the recorded dataflow for the second randomly selected portion to a computer server.

12. The computer program product of claim 9 wherein the application includes at least one data path that is not used to record dataflow for the first randomly selected portion, and that is also not used to record dataflow for the second randomly selected portion, and the computer program product is further configured for applying a static dataflow model to the at least one data path.

13. The computer program product of claim 9 further configured for applying the first and second instrumentation procedures to the application using an epsilon net coverage criterion for the application.

14. The computer program product of claim 13 further configured for adding instrumentation code to the application until epsilon coverage for a designated or predetermined value of epsilon is reached.

15. The computer program product of claim 14 further configured for adding the instrumentation code at random.

16. The computer program product of claim 14 further configured for adding the instrumentation code using an empirical probability distribution, to provide coverage of substantially all dataflow paths for the application.

17. An apparatus for performing dataflow analysis, the apparatus comprising a processor and a memory coupled to the processor, wherein the memory comprises instructions which, when executed by the processor, cause the processor to:
  monitor a plurality of computing devices to detect an initiation of an application on one or more of the plurality of computing devices, wherein the plurality of computing devices comprises at least a first computing device and a second computing device;
  in response to detecting the initiation of the application on the first computing device, apply a first instrumentation procedure to a first randomly selected portion of the application to produce a recorded dataflow for the first randomly selected portion;
  in response to detecting the initiation of the application on the second computing device, apply a second instrumentation procedure to a second randomly selected portion of the application to produce a recorded dataflow for the second randomly selected portion; and
  assemble an integrated dataflow solution for the application from the recorded dataflow for the first randomly selected portion and the recorded dataflow for the second randomly selected portion.

18. The apparatus of claim 17 wherein the application comprises a plurality of statements, and the apparatus is further configured for performing the first and second instrumentation procedures sparsely, such that only a small fraction of the plurality of statements are used to produce the recorded dataflow for the first randomly selected portion and the recorded dataflow for the second randomly selected portion, wherein the small fraction comprises less than 20% of a total number of code statements in the application.

19. The apparatus of claim 17 further configured for providing the integrated dataflow solution by periodically, repeatedly or continuously transmitting at least one of the recorded dataflow for the first randomly selected portion or the recorded dataflow for the second randomly selected portion to a computer server.

20. The apparatus of claim 17 wherein the application includes at least one data path that is not used to record dataflow for the first randomly selected portion, and that is also not used to record dataflow for the second randomly selected portion, and the apparatus is further configured for applying a static dataflow model to the at least one data path.

* * * * *